US007956712B2

(12) United States Patent
Fullerton et al.

(10) Patent No.: US 7,956,712 B2
(45) Date of Patent: Jun. 7, 2011

(54) CORRELATED MAGNETIC ASSEMBLIES FOR SECURING OBJECTS IN A VEHICLE

(75) Inventors: Larry W. Fullerton, New Hope, AL (US); Mark D. Roberts, Hunstville, AL (US); Robert S. Babayi, Washington, DC (US); Willard W. Case, Madison, AL (US)

(73) Assignee: Cedar Ridge Research, LLC., New Hope, AL (US)

( * ) Notice: Subject to any disclaimer, the term of this patent is extended or adjusted under 35 U.S.C. 154(b) by 0 days.

(21) Appl. No.: 12/895,061

(22) Filed: Sep. 30, 2010

(65) Prior Publication Data

US 2011/0018665 A1 Jan. 27, 2011

Related U.S. Application Data

(63) Continuation-in-part of application No. 12/476,952, filed on Jun. 2, 2009.

(60) Provisional application No. 61/247,793, filed on Oct. 1, 2009.

(51) Int. Cl.
*H01F 7/20* (2006.01)
*H01F 7/02* (2006.01)
*A44B 1/04* (2006.01)

(52) U.S. Cl. ........................... 335/285; 335/306; 24/303

(58) Field of Classification Search .................. 335/285, 335/302–306; 24/303; 248/309.4
See application file for complete search history.

(56) References Cited

U.S. PATENT DOCUMENTS 381,968 A 5/1888 Tesla
493,858 A 3/1893 Edison
996,933 A 7/1911 Lindquist
1,236,234 A 8/1917 Troje
2,389,298 A 11/1945 Ellis
2,570,625 A 10/1951 Zimmerman et al.
2,722,617 A 11/1955 Cluwen et al.
2,932,545 A 4/1960 Foley
3,102,314 A 9/1963 Alderfer
3,208,296 A 9/1965 Baermann
3,288,511 A 11/1966 Tavano
3,468,576 A 9/1969 Beyer et al.

(Continued)

FOREIGN PATENT DOCUMENTS

FR 823395 1/1938

(Continued)

OTHER PUBLICATIONS

"BNS Series-Compatible Series AES Safety Controllers"pp. 1-17, http://www.schmersalusa.com/safety_controllers/drawings/aes.pdf (downloaded on or before Jan. 23, 2009).

(Continued)

*Primary Examiner* — Ramon M Barrera
(74) *Attorney, Agent, or Firm* — George P. Kobler; William J. Tucker

(57) ABSTRACT

A correlated magnetic assembly for securing objects in a vehicle includes an object that incorporates a first field emission structure and a surface within the vehicle that incorporates a second field emission structure. The first and second field emission structures each include an array of field emission sources each having positions and polarities relating to a desired spatial force function that corresponds to a complementary alignment of the first and second field emission structures within a field domain. The object is attached to the surface of the vehicle when the first and second field emission structures are located next to one another and have a complementary alignment with respect to one another.

33 Claims, 11 Drawing Sheets

U.S. PATENT DOCUMENTS

| | | | |
|---|---|---|---|
| 3,474,366 | A | 10/1969 | Barney |
| 3,802,034 | A | 4/1974 | Bookless |
| 4,079,558 | A | 3/1978 | Gorham |
| 4,222,489 | A | 9/1980 | Hutter |
| 4,453,294 | A | 6/1984 | Morita |
| 4,547,756 | A | 10/1985 | Miller et al. |
| 4,629,131 | A | 12/1986 | Podell |
| 4,941,236 | A | 7/1990 | Sherman |
| 5,050,276 | A | 9/1991 | Pemberton |
| 5,367,891 | A | 11/1994 | Furuyama |
| 5,383,049 | A | 1/1995 | Carr |
| 5,631,093 | A | 5/1997 | Perry et al. |
| 5,631,618 | A | 5/1997 | Trumper et al. |
| 5,956,778 | A | 9/1999 | Godoy |
| 5,983,406 | A | 11/1999 | Meyerrose |
| 6,072,251 | A | 6/2000 | Markle |
| 6,115,849 | A | 9/2000 | Meyerrose |
| 6,170,131 | B1 | 1/2001 | Shin |
| 6,275,778 | B1 | 8/2001 | Shimada et al. |
| 6,457,179 | B1 | 10/2002 | Prendergast |
| 6,607,304 | B1 | 8/2003 | Lake et al. |
| 6,720,698 | B2 | 4/2004 | Galbraith |
| 6,847,134 | B2 | 1/2005 | Frissen et al. |
| 6,862,748 | B2 | 3/2005 | Prendergast |
| 7,066,778 | B2 | 6/2005 | Kretzschmar |
| 6,927,657 | B1 | 8/2005 | Wu |
| 6,971,147 | B2 | 12/2005 | Halstead |
| 7,362,018 | B1 | 4/2008 | Kulogo et al. |
| 7,444,683 | B2 | 11/2008 | Prendergast et al. |
| 2004/0003487 | A1 | 1/2004 | Reiter |
| 2006/0066428 | A1 | 3/2006 | McCarthy et al. |
| 2006/0189259 | A1 | 8/2006 | Park |
| 2006/0290451 | A1 | 12/2006 | Prendergast et al. |
| 2008/0186683 | A1 | 8/2008 | Ligtenberg et al. |
| 2008/0272868 | A1 | 11/2008 | Prendergast et al. |
| 2008/0282517 | A1 | 11/2008 | Claro |

FOREIGN PATENT DOCUMENTS

| | | | |
|---|---|---|---|
| WO | 2007081830 | A2 | 7/2007 |

OTHER PUBLICATIONS

"Magnetic Safety Sensors"pp. 1-3, http://farnell.com/datasheets/6465.pdf (downloaded on or before Jan. 23, 2009).

"Series BNS-B20 Coded-Magnet Sensor Safety Door Handle" pp. 1-2, http://www.schmersalusa.com/catalog__pdfs/BNS__B20.pdf (downloaded on or before Jan. 23, 2009).

"Series BNS333 Coded-Magnet Sensors with Integrated Safety Control Module" pp. 1-2, http://www.schmersalusa.com/machine__guarding/coded__magnet/drawings/bns333.pdf (downloaded on or before Jan. 23, 2009).

FIG. 3B
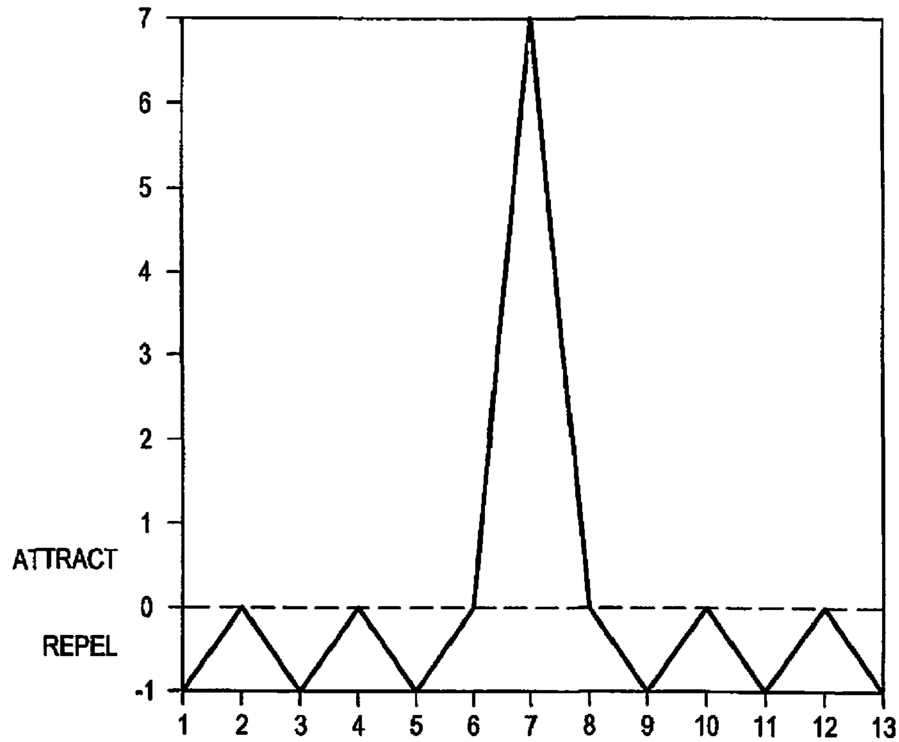
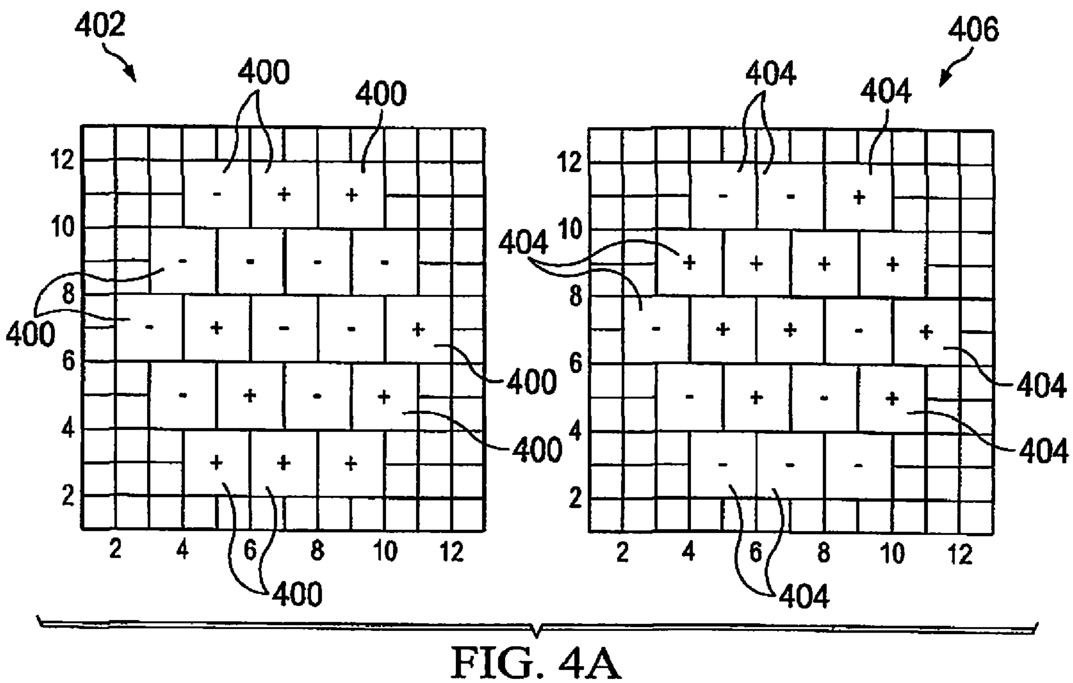
FIG. 4A

FIG. 11A
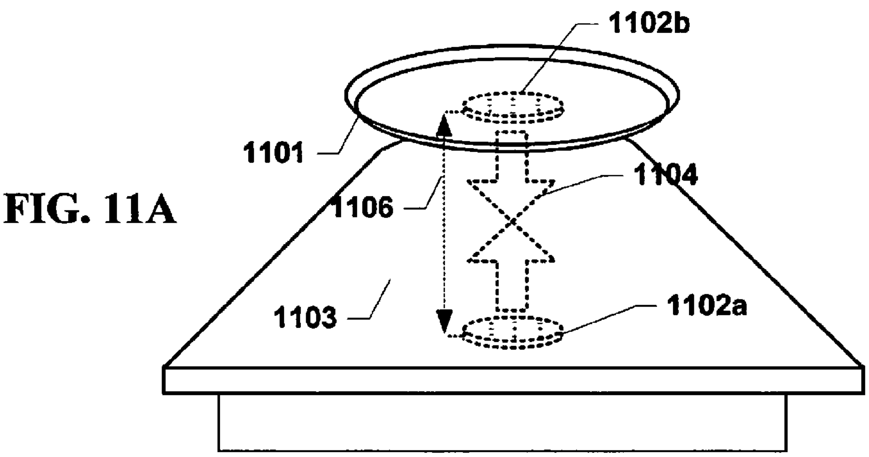
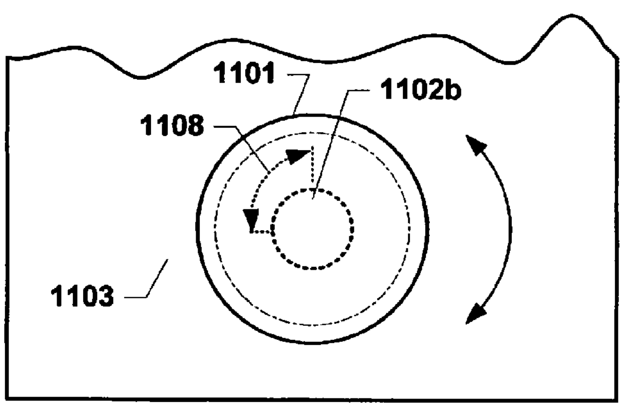
FIG. 11B
FIG. 11C
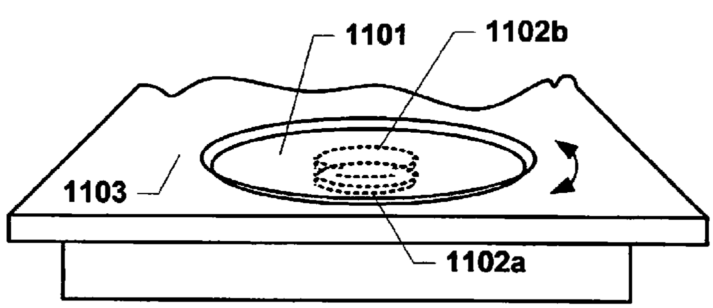

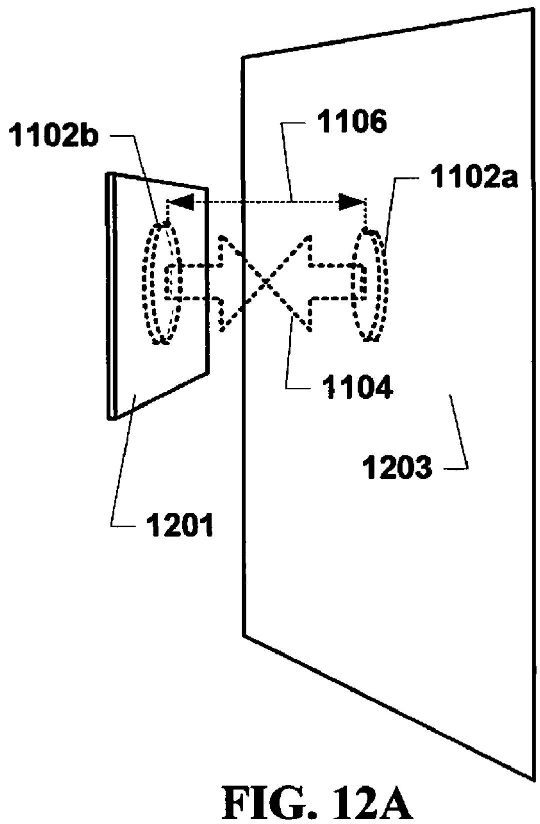
FIG. 12A
FIG. 12B
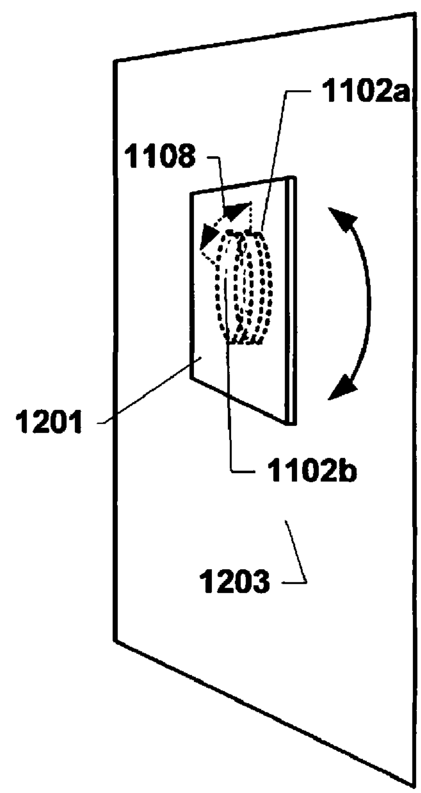

CORRELATED MAGNETIC ASSEMBLIES FOR SECURING OBJECTS IN A VEHICLE

CLAIMING BENEFIT OF PRIOR FILED U.S. APPLICATION

This patent application claims the benefit of U.S. Provisional Application Ser. No. 61/247,793, filed Oct. 1, 2009, and entitled "Correlated Magnetic Assemblies for Securing Objects in a Vehicle". The contents of this document are hereby incorporated by reference herein.

CROSS REFERENCE TO RELATED APPLICATIONS

This patent application is a continuation-in-part to U.S. patent application Ser. No. 12/476,952 filed on Jun. 2, 2009 and entitled "A Field Emission System and Method", which is a continuation-in-part application of U.S. patent application Ser. No. 12/322,561 filed on Feb. 4, 2009 and entitled "A System and Method for Producing an Electric Pulse", which is a continuation-in-part application of U.S. patent application Ser. No. 12/358,423 filed on Jan. 23, 2009 and entitled "A Field Emission System and Method", which is a continuation-in-part application of U.S. patent application Ser. No. 12/123,718 filed on May 20, 2008 and entitled "A Field Emission System and Method". The contents of these four documents are hereby incorporated herein by reference.

FIELD

The present disclosure relates to securing objects to surfaces using correlated magnetic assemblies wherein an object and a surface to which it is to be secured each incorporate correlated magnetic structures, or magnetic field emission structures. More particularly, the present disclosure relates to securing objects to surfaces within a vehicle using correlated magnetic assemblies.

DESCRIPTION OF THE PROBLEM AND RELATED ART

One aspect of travel on water is the possibility of encountering rough water which could roll or pitch the water craft, whether it is a small fishing boat, a sailboat, a yacht, or even a deep-draft vessel. Similarly, aircraft can be subjected to turbulence, ground vehicles can encounter rough terrain, and space vehicles can be subjected to violent forces that shake the space vehicles. Accordingly, considerable effort has gone into devising methods for securing objects within vehicles, for example a water vessel, to prevent such objects from sliding, or rolling within the vehicle compartments, or falling. Such an undesired event could result in damage to other equipment or injury to persons within the vehicle. Such methods typically require significant time and effort to secure objects and to release secured objects. Therefore, there has been a need for an improved system and method for securing objects in a moving vehicle.

SUMMARY

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

Disclosed hereinbelow is an exemplary assembly for securing objects to surfaces within a moving vehicle. For exemplary purposes, the described vehicle is a water borne craft which takes advantage of the benefits of a newly-developed technology sometimes referred to as "correlated magnetics." Accordingly, one version of such an assembly includes a boat, or ship, with a surface, for example a horizontal, a vertical surface, an angled surface, or any other surface that includes a first magnetic field emission structure. An object to be secured to the surface includes a second magnetic field emission structure that is designed to be complementary to the first structure such that the object may be secured to the surface through the generation of a peak spatial attracting force resulting when the first and second magnetic field emission structures are substantially aligned. The object may be removed from the surface by rotating the object, and thus, the magnetic field emission structures with respect to each other, which, as will be described below, results in a diminished spatial attracting force, and, possibly in a repelling force, depending upon the configuration of the field emission structures. Depending on the design of the structures, other forces such as a pull force, a shear force, or any other force sufficient to overcome the attractive peak spatial force between the substantially aligned first and second magnetic field emission structures can be used to remove the object from the surface.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The present invention is described with reference to the accompanying drawings. In the drawings, like reference numbers, and specifically, common last digit(s), indicate identical or functionally similar elements. Additionally, the left-most digit(s) of a reference number identifies the drawing in which the reference number first appears.

FIGS. 11A through 11C illustrate the use of exemplary magnetic field emission structures for securing objects to horizontal surfaces;

FIGS. 12A and 12B illustrate the use of exemplary magnetic field emission structures for securing objects to vertical surfaces.

DETAILED DESCRIPTION

Figure 1:
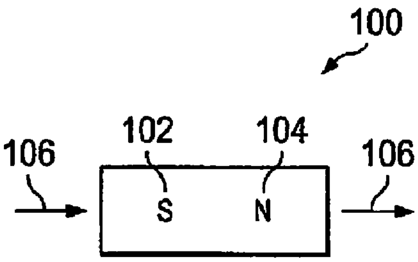
FIGS. 1-9 are various diagrams used to help explain different concepts about correlated magnetic technology which can be utilized in an embodiment of the present invention.

The various embodiments of the present invention and their advantages are best understood by referring to FIGS. 1 through 13 of the drawings. The elements of the drawings are not necessarily to scale, emphasis instead being placed upon clearly illustrating the principles of the invention. Throughout the drawings, like numerals are used for like and corresponding parts of the various drawings.

The drawings represent and illustrate examples of the various embodiments of the invention, and not a limitation thereof. It will be apparent to those skilled in the art that various modifications and variations can be made in the present inventions without departing from the scope and spirit of the invention as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present invention covers such modifications as come within the scope of the features and their equivalents.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Correlated Magnetics Technology

A new revolutionary technology called correlated magnetics was first fully described and enabled in the co-assigned U.S. patent application Ser. No. 12/123,718 filed on May 20, 2008 and entitled "A Field Emission System and Method", now U.S. Pat. No. 7,800,471, issued Sep. 21, 2010. The contents of this document are hereby incorporated herein by reference. A second generation of a correlated magnetic technology is described and enabled in the co-assigned U.S. patent application Ser. No. 12/358,423 filed on Jan. 23, 2009, and entitled "A Field Emission System and Method". The contents of this document are hereby incorporated herein by reference. A third generation of a correlated magnetic technology is described and enabled in the co-assigned U.S. patent application Ser. No. 12/476,952 filed on Jun. 2, 2009 and entitled "A Field Emission System and Method". The contents of this document are hereby incorporated herein by reference. Correlated inductance technology, which is related to correlated magnetics technology, is described and enabled in the co-assigned U.S. patent application Ser. No. 12/322,561 filed on Feb. 4, 2009 and entitled "A System and Method for Producing and Electric Pulse". The contents of this document are hereby incorporated by reference. A brief discussion about correlated magnetics is provided first before a detailed discussion is provided about the correlated magnetic assemblies for securing objects in water craft.

This section is provided to introduce the reader to basic magnets and the new and revolutionary correlated magnetic technology. This section includes subsections relating to basic magnets, correlated magnets, and correlated electromagnetics. It should be understood that this section is provided to assist the reader with understanding the present invention, and should not be used to limit the scope of the present invention.

A. Magnets

A magnet is a material or object that produces a magnetic field which is a vector field that has a direction and a magnitude (also called strength). Referring to FIG. 1, there is illustrated an exemplary magnet 100 which has a South pole 102 and a North pole 104 and magnetic field vectors 106 that represent the direction and magnitude of the magnet's moment. The magnet's moment is a vector that characterizes the overall magnetic properties of the magnet 100. For a bar magnet, the direction of the magnetic moment points from the South pole 102 to the North pole 104. The North and South poles 104 and 102 are also referred to herein as positive (+) and negative (−) poles, respectively.

Figure 2A:
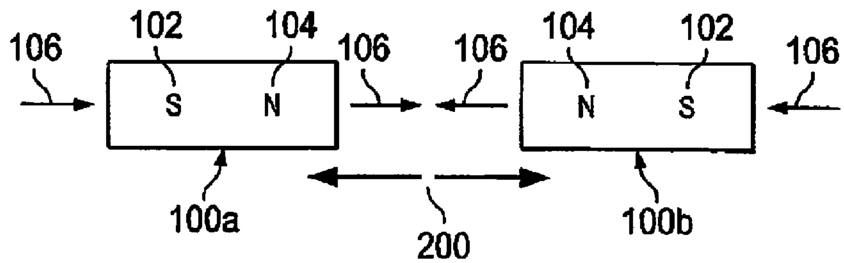
Figure 2B:
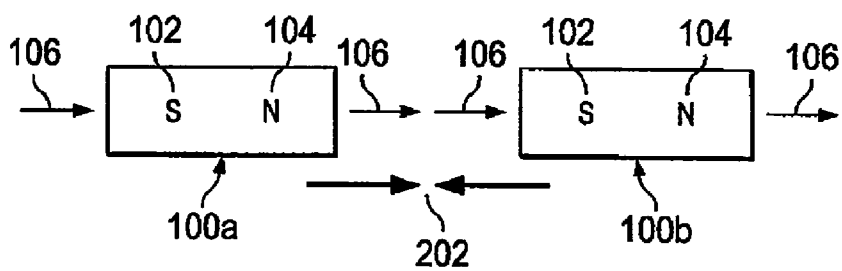
Figure 2C:
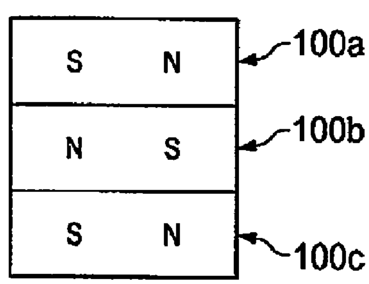

Referring to FIG. 2A, there is a diagram that depicts two magnets 100*a* and 100*b* aligned such that their polarities are opposite in direction resulting in a repelling spatial force 200 which causes the two magnets 100*a* and 100*b* to repel each other. In contrast, FIG. 2B is a diagram that depicts two magnets 100*a* and 100*b* aligned such that their polarities are in the same direction resulting in an attracting spatial force 202 which causes the two magnets 100*a* and 100*b* to attract each other. In FIG. 2B, the magnets 100*a* and 100*b* are shown as being aligned with one another but they can also be partially aligned with one another where they could still "stick" to each other and maintain their positions relative to each other. FIG. 2C is a diagram that illustrates how magnets 100*a*, 100*b* and 100*c* will naturally stack on one another such that their poles alternate.

B. Correlated Magnets

Correlated magnets can be created in a wide variety of ways depending on the particular application as described in the aforementioned U.S. patent application Ser. Nos. 12/123,718, 12/358,423, and 12/476,952 by using a unique combination of magnet arrays (referred to herein as magnetic field emission sources), correlation theory (commonly associated with probability theory and statistics) and coding theory (commonly associated with communication systems). A brief discussion is provided next to explain how these widely diverse technologies are used in a unique and novel way to create correlated magnets.

Basically, correlated magnets are made from a combination of magnetic (or electric) field emission sources which have been configured in accordance with a pre-selected code having desirable correlation properties. Thus, when a magnetic field emission structure is brought into alignment with a complementary magnetic field emission structure the various magnetic field emission sources will all align causing a peak spatial attraction force to be produced, while the misalignment of the magnetic field emission structures cause the various magnetic field emission sources to substantially cancel each other out in a manner that is a function of the particular code used to design the two magnetic field emission structures. In contrast, when a magnetic field emission structure is brought into alignment with a duplicate magnetic field emission structure then the various magnetic field emission sources all align causing a peak spatial repelling force to be produced, while the misalignment of the magnetic field emission structures causes the various magnetic field emission sources to substantially cancel each other out in a manner that is a function of the particular code used to design the two magnetic field emission structures.

The aforementioned spatial forces (attraction, repelling) have a magnitude that is a function of the relative alignment of two magnetic field emission structures and their corresponding spatial force (or correlation) function, the spacing (or distance) between the two magnetic field emission structures, and the magnetic field strengths and polarities of the various sources making up the two magnetic field emission structures. The spatial force functions can be used to achieve precision alignment and precision positioning not possible with basic magnets. Moreover, the spatial force functions can enable the precise control of magnetic fields and associated spatial forces thereby enabling new forms of attachment devices for attaching objects with precise alignment and new systems and methods for controlling precision movement of objects. An additional unique characteristic associated with correlated magnets relates to the situation where the various magnetic field sources making-up two magnetic field emission structures can effectively cancel out each other when they are brought out of alignment which is described herein as a release force. This release force is a direct result of the particular correlation coding used to configure the magnetic field emission structures.

A person skilled in the art of coding theory will recognize that there are many different types of codes that have different correlation properties which have been used in communications for channelization purposes, energy spreading, modulation, and other purposes. Many of the basic characteristics of such codes make them applicable for use in producing the magnetic field emission structures described herein. For example, Barker codes are known for their autocorrelation properties and can be used to help configure correlated magnets. Although, a Barker code is used in an example below with respect to FIGS. 3A-3B, other forms of codes which may or may not be well known in the art are also applicable to correlated magnets because of their autocorrelation, cross-correlation, or other properties including, for example, Gold codes, Kasami sequences, hyperbolic congruential codes, quadratic congruential codes, linear congruential codes, Welch-Costas array codes, Golomb-Costas array codes, pseudorandom codes, chaotic codes, Optimal Golomb Ruler codes, deterministic codes, designed codes, one dimensional codes, two dimensional codes, three dimensional codes, four dimensional codes, or any combination thereof, and so forth.

Generally, the spatial force functions of the present invention are in accordance with a code, where the code corresponding to a code modulo of first field emission sources and a complementary code modulo of second field emission sources. The code defines a peak spatial force corresponding to substantial alignment of the code modulo of the first field emission sources with the complementary code modulo of the second field emission sources. The code also defines a plurality of off peak spatial forces corresponding to a plurality of different misalignments of the code modulo of the first field emission sources and the complementary code modulo of the second field emission sources. The plurality of off peak spatial forces have a largest off peak spatial force, where the largest off peak spatial force is less than half of the peak spatial force.

Figure 3A:
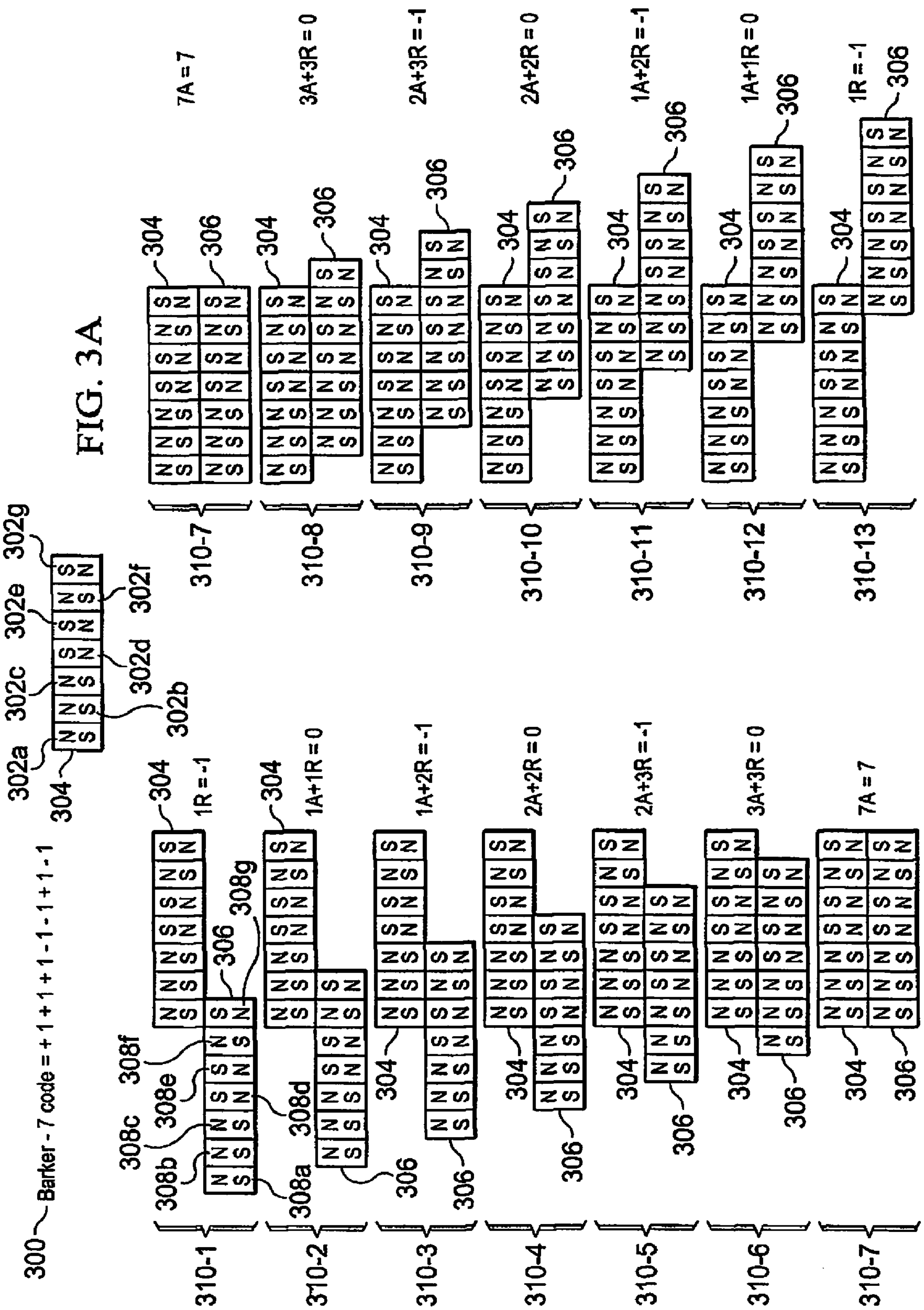

Referring to FIG. 3A, there are diagrams used to explain how a Barker length 7 code 300 can be used to determine polarities and positions of magnets 302*a*, 302*b* . . . 302*g* making up a first magnetic field emission structure 304. Each magnet 302*a*, 302*b* . . . 302*g* has the same or substantially the same magnetic field strength (or amplitude), which for the sake of this example is provided as a unit of 1 (where A=Attract, R=Repel, A=−R, A=1, R=−1). A second magnetic field emission structure 306 (including magnets 308*a*, 308*b* . . . 308*g*) that is identical to the first magnetic field emission structure 304 is shown in 13 different alignments 310-1 through 310-13 relative to the first magnetic field emission structure 304. For each relative alignment, the number of magnets that repel plus the number of magnets that attract is calculated, where each alignment has a spatial force in accordance with a spatial force function based upon the correlation function and magnetic field strengths of the magnets 302*a*, 302*b* . . . 302*g* and 308*a*, 308*b* . . . 308*g*. With the specific Barker code used, the spatial force varies from −1 to 7, where the peak occurs when the two magnetic field emission structures 304 and 306 are aligned which occurs when their respective codes are aligned. The off peak spatial force, referred to as a side lobe force, varies from 0 to −1. As such, the spatial force function causes the magnetic field emission structures 304 and 306 to generally repel each other unless they are aligned such that each of their magnets are correlated with a complementary magnet (i.e., a magnet's South pole aligns with another magnet's North pole, or vice versa). In other words, the two magnetic field emission structures 304 and 306 substantially correlate with one another when they are aligned to substantially mirror each other.

In FIG. 3B, there is a plot that depicts the spatial force function of the two magnetic field emission structures 304 and 306 which results from the binary autocorrelation function of the Barker length 7 code 300, where the values at each alignment position 1 through 13 correspond to the spatial force values that were calculated for the thirteen alignment positions 310-1 through 310-13 between the two magnetic field emission structures 304 and 306 depicted in FIG. 3A. As the true autocorrelation function for correlated magnet field structures is repulsive, and most of the uses envisioned will have attractive correlation peaks, the usage of the term 'autocorrelation' herein will refer to complementary correlation unless otherwise stated. That is, the interacting faces of two such correlated magnetic field emission structures 304 and 306 will be complementary to each other, i.e., each magnetic field emission source is aligned with a source of opposite polarity. This complementary autocorrelation relationship can be seen in FIG. 3A where the bottom face of the first magnetic field emission structure 304 having the pattern 'S S S N N S N' is shown interacting with the top face of the second magnetic field emission structure 306 having the pattern 'N N N S S N S', which is the mirror image (pattern) of the bottom face of the first magnetic field emission structure 304.

Figure 4B:
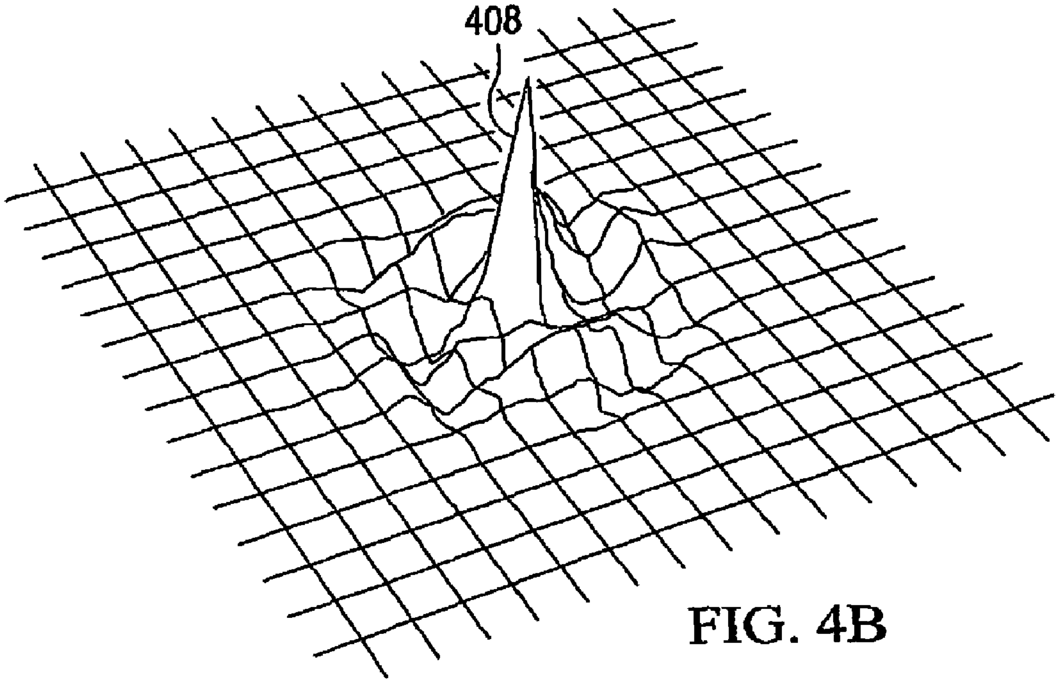
Figure 4C:
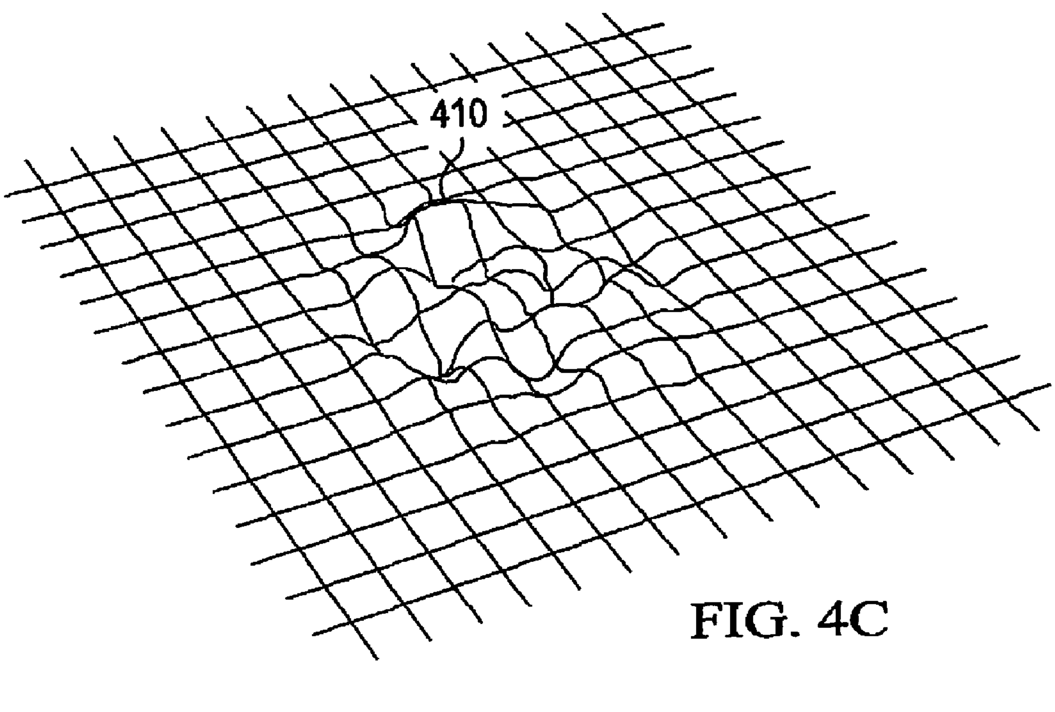

Referring to FIG. 4A, there is a diagram of an exemplary array of 19 magnets 400 positioned in accordance with an exemplary code to produce an exemplary magnetic field emission structure 402 and another array of 19 magnets 404 which is used to produce a mirror image magnetic field emission structure 406. In this example, the exemplary code was intended to produce the first magnetic field emission structure 402 to have a first stronger lock when aligned with its mirror image magnetic field emission structure 406 and a second weaker lock when it is rotated 90° relative to its mirror image magnetic field emission structure 406. FIG. 4B depicts a spatial force function 408 of the magnetic field emission structure 402 interacting with its mirror image magnetic field emission structure 406 to produce the first stronger lock. As can be seen, the spatial force function 408 has a peak which occurs when the two magnetic field emission structures 402 and 406 are substantially aligned. FIG. 4C depicts a spatial force function 410 of the magnetic field emission structure 402 interacting with its mirror magnetic field emission structure 406 after being rotated 90°. As can be seen, the spatial force function 410 has a smaller peak which occurs when the two magnetic field emission structures 402 and 406 are substantially aligned but one structure is rotated 90°. If the two magnetic field emission structures 402 and 406 are in other positions then they could be easily separated.

Figure 5:
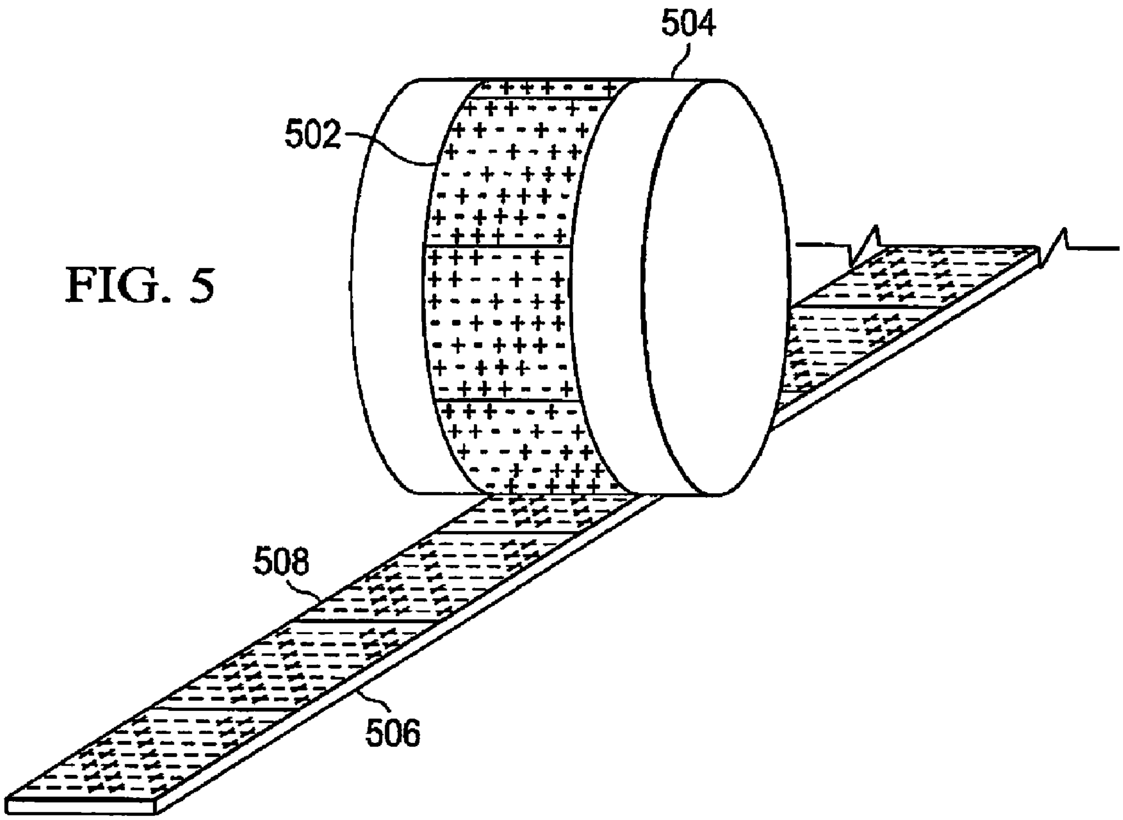

Referring to FIG. 5, there is a diagram depicting a correlating magnet surface 502 being wrapped back on itself on a cylinder 504 (or disc 504, wheel 504) and a conveyor belt/tracked structure 506 having located thereon a mirror image correlating magnet surface 508. In this case, the cylinder 504 can be turned clockwise or counter-clockwise by some force so as to roll along the conveyor belt/tracked structure 506. The fixed magnetic field emission structures 502 and 508 provide a traction and gripping (i.e., holding) force as the cylinder 504 is turned by some other mechanism (e.g., a motor). The gripping force would remain substantially constant as the cylinder 504 moved down the conveyor belt/tracked structure 506 independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures 502 and 508. If desired, this cylinder 504 (or other rotary devices) can also be operated against other rotary correlating surfaces to provide a gear-like operation. Since the hold-down force equals the traction force, these gears can be loosely connected and still give positive, non-slipping rotational accuracy. Plus, the magnetic field emission structures 502 and 508 can have surfaces which are perfectly smooth and still provide positive, non-slip traction. In contrast to legacy friction-based wheels, the traction force provided by the magnetic field emission structures 502 and 508 is largely independent of the friction forces between the traction wheel and the traction surface and can be employed with low friction surfaces. Devices moving about based on magnetic traction can be operated independently of gravity for example in weightless conditions including space, underwater, vertical surfaces and even upside down.

Figure 6:
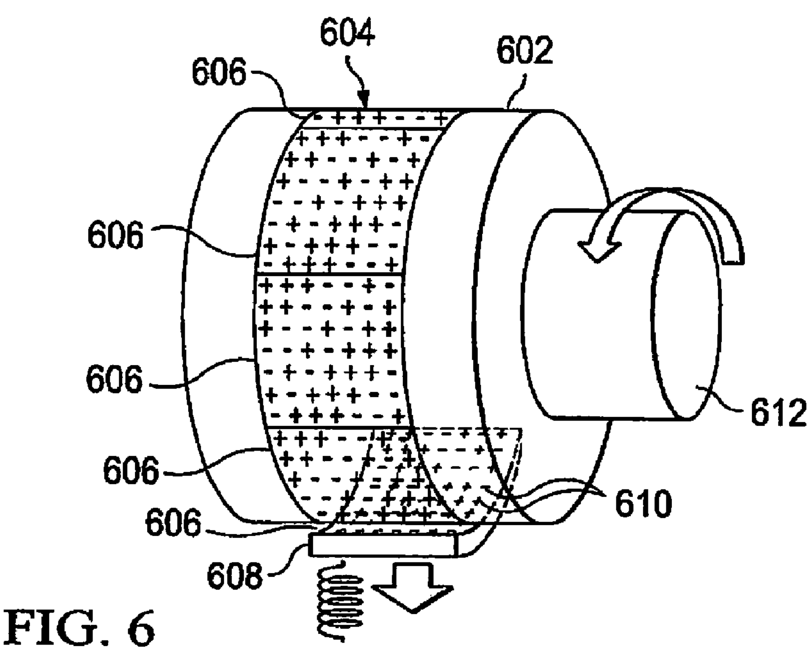

Referring to FIG. 6, there is a diagram depicting an exemplary cylinder 602 having wrapped thereon a first magnetic field emission structure 604 with a code pattern 606 that is repeated six times around the outside of the cylinder 602. Beneath the cylinder 602 is an object 608 having a curved surface with a slightly larger curvature than the cylinder 602 and having a second magnetic field emission structure 610 that is also coded using the code pattern 606. Assume, the cylinder 602 is turned at a rotational rate of 1 rotation per second by shaft 612. Thus, as the cylinder 602 turns, six times a second the first magnetic field emission structure 604 on the cylinder 602 aligns with the second magnetic field emission structure 610 on the object 608 causing the object 608 to be repelled (i.e., moved downward) by the peak spatial force function of the two magnetic field emission structures 604 and 610. Similarly, had the second magnetic field emission structure 610 been coded using a code pattern that mirrored code pattern 606, then 6 times a second the first magnetic field emission structure 604 of the cylinder 602 would align with the second magnetic field emission structure 610 of the object 608 causing the object 608 to be attracted (i.e., moved upward) by the peak spatial force function of the two magnetic field emission structures 604 and 610. Thus, the movement of the cylinder 602 and the corresponding first magnetic field emission structure 604 can be used to control the movement of the object 608 having its corresponding second magnetic field emission structure 610. One skilled in the art will recognize that the cylinder 602 may be connected to a shaft 612 which may be turned as a result of wind turning a windmill, a water wheel or turbine, ocean wave movement, and other methods whereby movement of the object 608 can result from some source of energy scavenging. As such, correlated magnets enables the spatial forces between objects to be precisely controlled in accordance with their movement and also enables the movement of objects to be precisely controlled in accordance with such spatial forces.

In the above examples, the correlated magnets 304, 306, 402, 406, 502, 508, 604 and 610 overcome the normal 'magnet orientation' behavior with the aid of a holding mechanism such as an adhesive, a screw, a bolt & nut, etc. . . . In other cases, magnets of the same magnetic field emission structure could be sparsely separated from other magnets (e.g., in a sparse array) such that the magnetic forces of the individual magnets do not substantially interact, in which case the polarity of individual magnets can be varied in accordance with a code without requiring a holding mechanism to prevent magnetic forces from 'flipping' a magnet. However, magnets are typically close enough to one another such that their magnetic forces would substantially interact to cause at least one of them to 'flip' so that their moment vectors align but these magnets can be made to remain in a desired orientation by use of a holding mechanism such as an adhesive, a screw, a bolt & nut, etc. . . . As such, correlated magnets often utilize some sort of holding mechanism to form different magnetic field emission structures which can be used in a wide-variety of applications like, for example, a turning mechanism, a tool insertion slot, alignment marks, a latch mechanism, a pivot mechanism, a swivel mechanism, a lever, a drill head assembly, a hole cutting tool assembly, a machine press tool, a gripping apparatus, a slip ring mechanism, and a structural assembly.

C. Correlated Electromagnetics

Correlated magnets can entail the use of electromagnets which is a type of magnet in which the magnetic field is produced by the flow of an electric current. The polarity of the magnetic field is determined by the direction of the electric current and the magnetic field disappears when the current ceases. Following are a couple of examples in which arrays of electromagnets are used to produce a first magnetic field emission structure that is moved over time relative to a second magnetic field emission structure which is associated with an object thereby causing the object to move.

Figure 7:
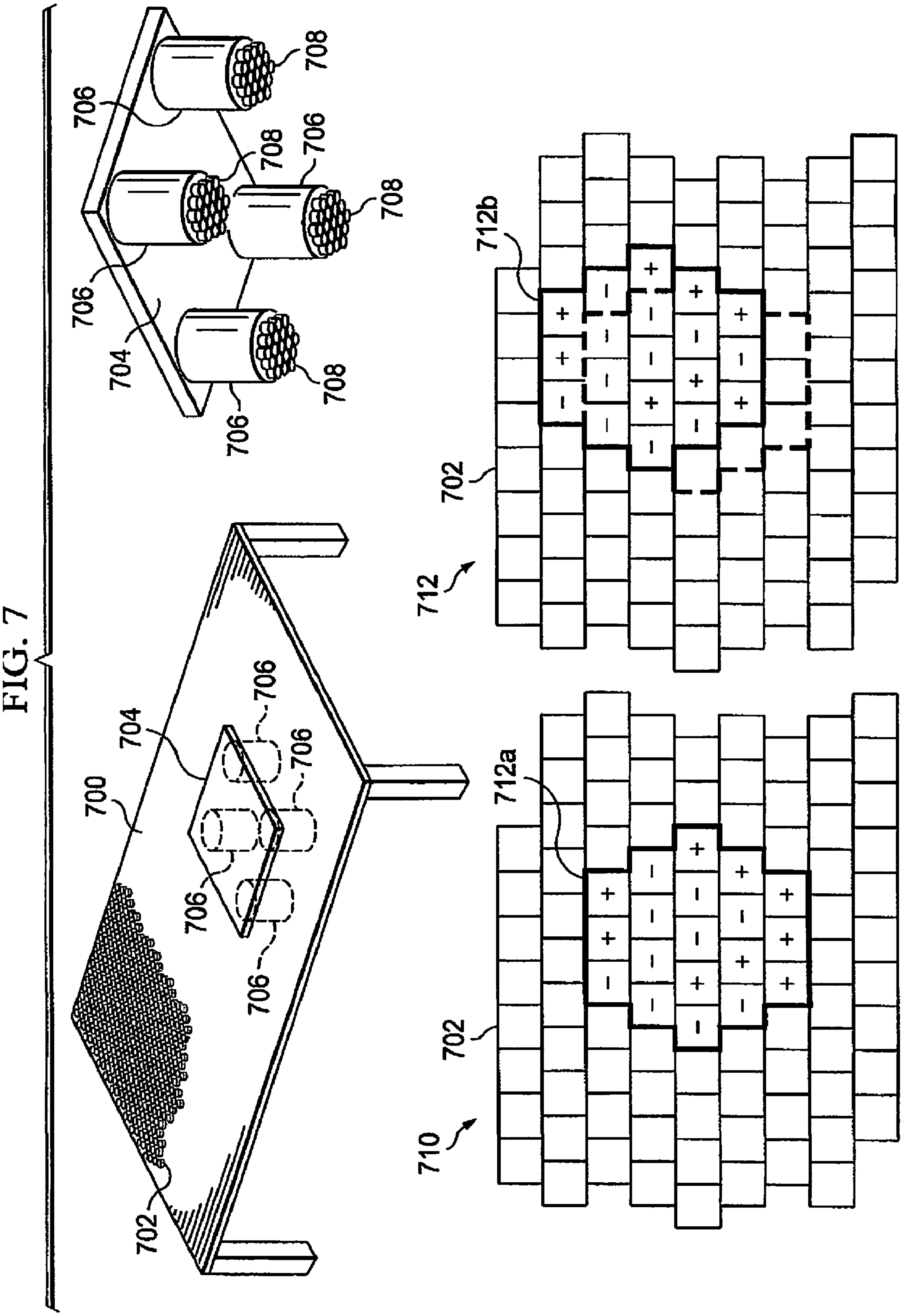

Referring to FIG. 7, there are several diagrams used to explain a 2-D correlated electromagnetics example in which there is a table 700 having a two-dimensional electromagnetic array 702 (first magnetic field emission structure 702) beneath its surface and a movement platform 704 having at least one table contact member 706. In this example, the movement platform 704 is shown having four table contact members 706 each having a magnetic field emission structure 708 (second magnetic field emission structures 708) that would be attracted by the electromagnet array 702. Computerized control of the states of individual electromagnets of the electromagnet array 702 determines whether they are on or off and determines their polarity. A first example 710 depicts states of the electromagnetic array 702 configured to cause one of the table contact members 706 to attract to a subset 712*a* of the electromagnets within the magnetic field emission structure 702. A second example 712 depicts different states of the electromagnetic array 702 configured to cause the one table contact member 706 to be attracted (i.e., move) to a different subset 712*b* of the electromagnets within the field emission structure 702. Per the two examples, one skilled in the art can recognize that the table contact member(s) 706 can be moved about table 700 by varying the states of the electromagnets of the electromagnetic array 702.

Figure 8:
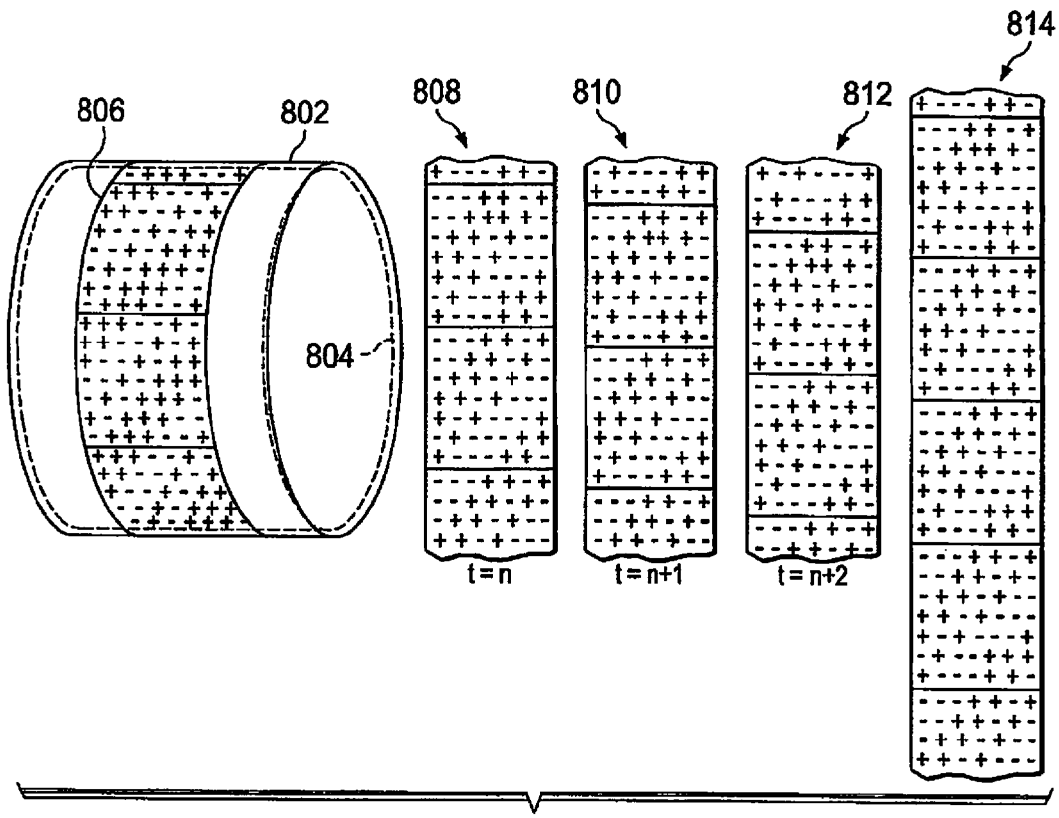

Referring to FIG. 8, there are several diagrams used to explain a 3-D correlated electromagnetics example where there is a first cylinder 802 which is slightly larger than a second cylinder 804 that is contained inside the first cylinder 802. A magnetic field emission structure 806 is placed around the first cylinder 802 (or optionally around the second cylinder 804). An array of electromagnets (not shown) is associated with the second cylinder 804 (or optionally the first cylinder 802) and their states are controlled to create a moving mirror image magnetic field emission structure to which the magnetic field emission structure 806 is attracted so as to cause the first cylinder 802 (or optionally the second cylinder 804) to rotate relative to the second cylinder 804 (or optionally the first cylinder 802). The magnetic field emission structures 808, 810, and 812 produced by the electromagnetic array on the second cylinder 804 at time t=n, t=n+1, and t=n+2, show a pattern mirroring that of the magnetic field emission structure 806 around the first cylinder 802. The pattern is shown moving downward in time so as to cause the first cylinder 802 to rotate counterclockwise. As such, the speed and direction of movement of the first cylinder 802 (or the second cylinder 804) can be controlled via state changes of the electromagnets making up the electromagnetic array. Also depicted in FIG. 8 there is an electromagnetic array 814 that corresponds to a track that can be placed on a surface such that a moving mirror image magnetic field emission structure can be used to move the first cylinder 802 backward or forward on the track using the same code shift approach shown with magnetic field emission structures 808, 810, and 812 (compare to FIG. 5).

Figure 9:
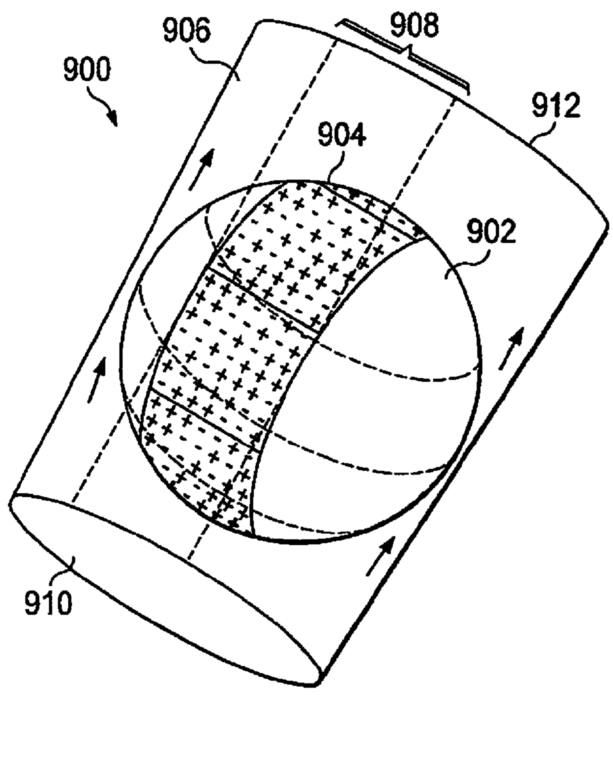

Referring to FIG. 9, there is illustrated an exemplary valve mechanism 900 based upon a sphere 902 (having a magnetic field emission structure 904 wrapped thereon) which is located in a cylinder 906 (having an electromagnetic field emission structure 908 located thereon). In this example, the electromagnetic field emission structure 908 can be varied to move the sphere 902 upward or downward in the cylinder 906 which has a first opening 910 with a circumference less than or equal to that of the sphere 902 and a second opening 912 having a circumference greater than the sphere 902. This configuration is desirable since one can control the movement of the sphere 902 within the cylinder 906 to control the flow rate of a gas or liquid through the valve mechanism 900. Similarly, the valve mechanism 900 can be used as a pressure control valve. Furthermore, the ability to move an object within another object having a decreasing size enables various types of sealing mechanisms that can be used for the sealing of windows, refrigerators, freezers, food storage containers, boat hatches, submarine hatches, etc., where the amount of sealing force can be precisely controlled. One skilled in the art will recognize that many different types of seal mechanisms that include gaskets, o-rings, and the like can be employed with the use of the correlated magnets. Plus, one skilled in the art will recognize that the magnetic field emission structures can have an array or sources including, for example, a permanent magnet, an electromagnet, an electret, a magnetized ferromagnetic material, a portion of a magnetized ferromagnetic material, a soft magnetic material, a superconductive magnetic material, or some combination thereof, and so forth.

Figure 10B:
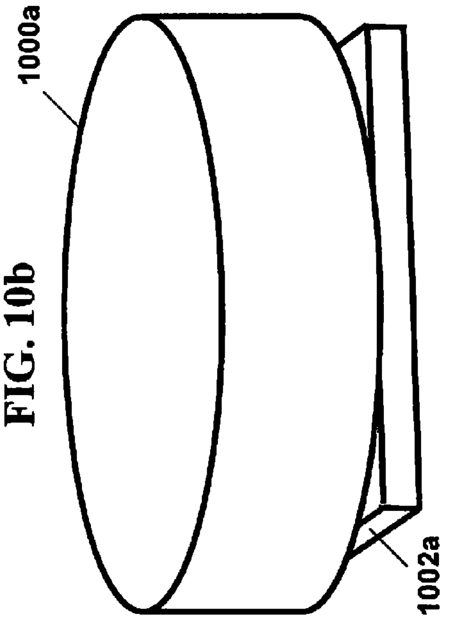
FIGS. 10A through 10D depict an exemplary method of manufacturing magnetic field emission structures using a ferromagnetic (or antiferromagnetic) material.
Figure 10D:
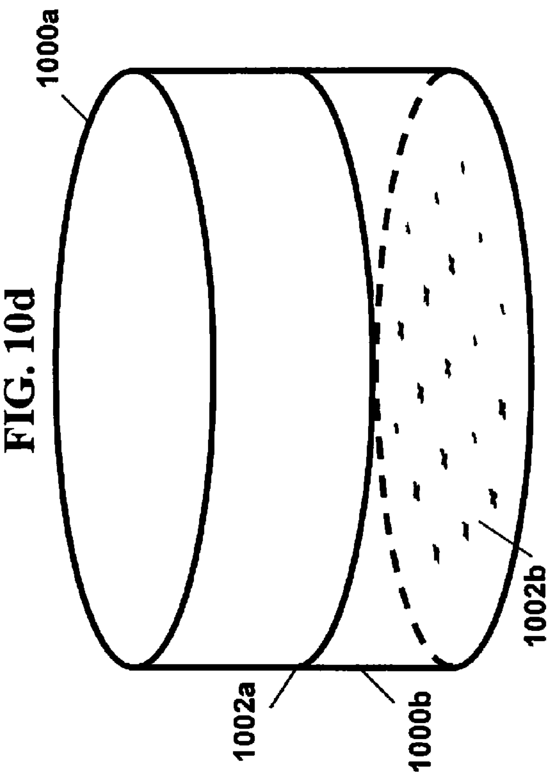
Figure 10A:
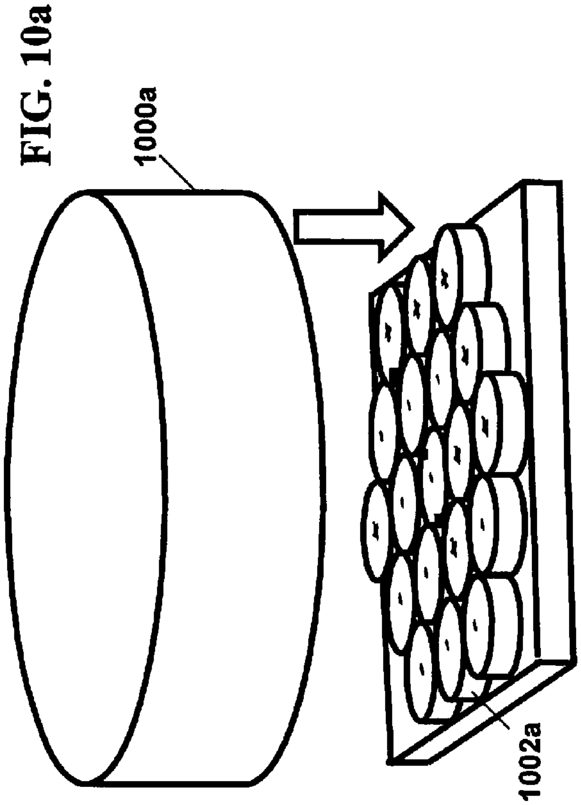
Figure 10C:
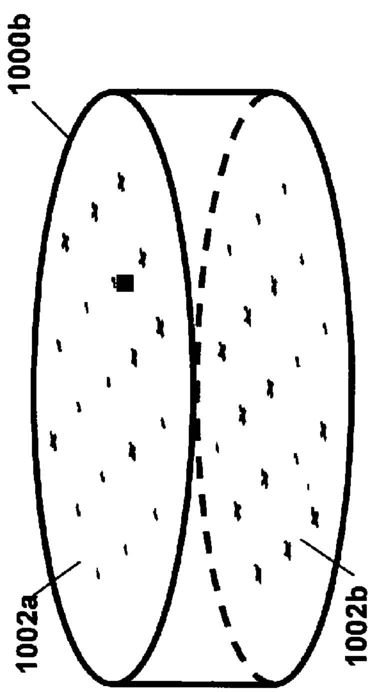

Forming Field Emission Structures with Ferromagnetic (Antiferromagnetic) Materials FIGS. 10*a* through 10*d* depict a manufacturing method for producing magnetic field emission structures. In FIG. 10*a*, a first magnetic field emission structure 1002*a* comprising an array of individual magnets is shown below a ferromagnetic material 1000*a* (e.g., iron) that is to become a second magnetic field emission structure having the same coding as the first magnetic field emission structure 1002*a*. In FIG. 10*b*, the ferromagnetic material 1000*a* has been heated to its Curie temperature (for antiferromagnetic materials this would instead be the Neel temperature). The ferromagnetic material 1000*a* is then brought in contact with the first magnetic field emission structure 1002*a* and allowed to cool. Thereafter, the ferromagnetic material 1000*a* takes on the same magnetic field emission structure properties of the first magnetic field emission structure 1002*a* and becomes a magnetized ferromagnetic material 1000*b*, which is itself a magnetic field emission structure, as shown in FIG. 10*c*. As depicted in FIG. 10*d*, should another ferromagnetic material 1000*a* be heated to its Curie temperature and then brought in contact with the magnetized ferromagnetic material 1000*b*, it too will take on the magnetic field emission structure properties of the magnetized ferromagnetic material 1000*b* as previously shown in FIG. 10*c*.

An alternative method of manufacturing a magnetic field emission structure from a ferromagnetic material would be to use one or more discrete high temperature heat sources, for example, lasers, to selectively heat up field emission source locations on the ferromagnetic material to the Curie temperature and then subject the locations to a magnetic field. With this approach, the magnetic field to which a heated field emission source location may be subjected may have a constant polarity or have a polarity varied in time so as to code the respective source locations as they are heated and cooled.

Correlated Magnetic Assemblies for Securing Objects in Water Craft

Now, with reference to FIG. 11, another exemplary apparatus utilizing magnetic field emission structures includes a surface, for example a horizontal surface on a table, ledge, or the like, 1103 that includes a first magnetic field emission structure 1102*a*. The horizontal surface is within any water craft, such as a sail boat, a yacht, a fishing boat, or a larger vessel, such as a freighter, tanker or other ship. The magnetic field emission structure 1102*a* may be affixed or mounted to the surface of the horizontal surface 1103, may be installed within, or embedded within the horizontal surface 1103. Similarly, an object 1101 includes a second magnetic field emission structure 1102*b* that may be affixed or mounted to the surface of the object 1101, installed within the object's surface, or embedded underneath the surface of the object 1101. Alternatively, the surface may comprise a ferromagnetic material and the field emission structure formed within the surface as described above.

In this implementation, magnetic field emission structures may be any such structure described above which is configured to exhibit a spatial attracting force when such structures are placed into a mutually complementary orientation. As described above, magnetic field emission structures 1102 comprise an array of a plurality of distinct magnetic field emission sources having positions and polarities arranged according to a desired spatial force function. When the second magnetic emission structure 1101*b* is brought into a certain complementary orientation with the first magnetic field emission structure 1102*a*, a peak spatial attracting force 1104 is generated in accordance with the spatial force function between the first and second magnetic field emission structures 1102, such that the two field emission structures 1102 are strongly attracted to each other. This orientation may be a co-axial angular alignment when using two dimensional arrays, as described above. The magnetic field emission structures 1102 are also configured such that angular misalignment of the second magnetic emission structure 1102*a* with respect to the first 1102*b* results in a diminished spatial attracting force, or, optionally, a spatial repelling force, such that the two field emission structures 1102 may be separated. Generally, the field emission structures 1102*a*, 1102*b* could have many different configurations and could be many different types of permanent magnets, electromagnets, and/or electro-permanent magnets where their size, shape, source strengths, coding, and other characteristics can be tailored to meet different requirements. Depending on the design of the structures, other forces such as a pull force, a shear force, or any other force sufficient to overcome the attractive peak spatial force between the substantially aligned first and second magnetic field emission structures can be used to separate the two structures.

The object 1101 may be placed on the horizontal surface 1103 and rotated to an orientation such that magnetic emission structures 1102 are substantially rotationally aligned 1106. As described above, rotational alignment 1106, or substantial rotational alignment, results in the generation of a peak spatial attracting force 1104. The peak spatial attracting force 1104 generated between the magnetic field emission structures 1102 draws the object 1101 and secures the object 1101 to the horizontal surface 1103. The object 1101 may be removed from the horizontal surface 1103 by rotating it as shown in FIGS. 11B, and 11C. Rotation of the object 1101, and thus rotation of the second magnetic field emission structure 1102*b* with respect to the first magnetic field emission structure 1102*a*, brings the two magnetic emission structures 1102 out of angular alignment 1108, and thus, diminishes the attracting spatial force between the object 1101 and the horizontal surface 1103, and allowing the object 1101 to be removed from the horizontal surface 1103. As mentioned above, the magnetic emission structures 1102 may be configured such at some rotational positions of the second vis-à-vis the first structure, the spatial force may be a repelling force, rather than a diminished attracting force.

It will be readily apparent that this arrangement is advantageous in also securing an object to a vertical surface, such as a wall, panel, or a bulkhead. For example, with reference to FIGS. 12A and 12B, a vertical surface 1203 may include a first magnetic field emission structure 1102*a*, which may be affixed or mounted to the surface of the vertical surface 1203, may be installed within, or embedded within the surface. An object 1201 to be secured to the vertical surface 1203 may include a second magnetic field emission structure 1102*b* which may be affixed or mounted to the object's 1201 surface, may be installed within, or embedded within the object's surface.

Similar to the implementation described in FIG. 11, the object 1201 may be placed on the vertical surface 1203, and rotated to an orientation such that magnetic emission structures 1102 are brought into substantial angular alignment 1106, i.e., where the peak spatial force 1106 generated between the magnetic field emission structures 1102 draws the object 1201 and secures the object 1201 to the vertical surface 1203.

The object 1201 may be removed from the vertical surface 1203 by rotating it as shown in FIG. 12B. Rotation of the object 1201, and thus rotation of the second magnetic field emission structure 1102*b* with respect to the first magnetic field emission structure 1102*a*, brings the two magnetic emission structures out of angular alignment and, thus, diminishes the attracting spatial force 1104 function between the object 1201 and the vertical surface 1203, allowing the object 1201 to be removed from the vertical surface 1203. Again, those skilled in the art will recognize that field emission structures 1102 may be configured to generate a repelling spatial force at certain angular misalignments to aid in removing object 1201 from the vertical surface. Generally, magnetic field emission structures 1102 may be used to secure an object to any surface having any orientation including but not limited to horizontal and vertical surfaces.

Figure 13:
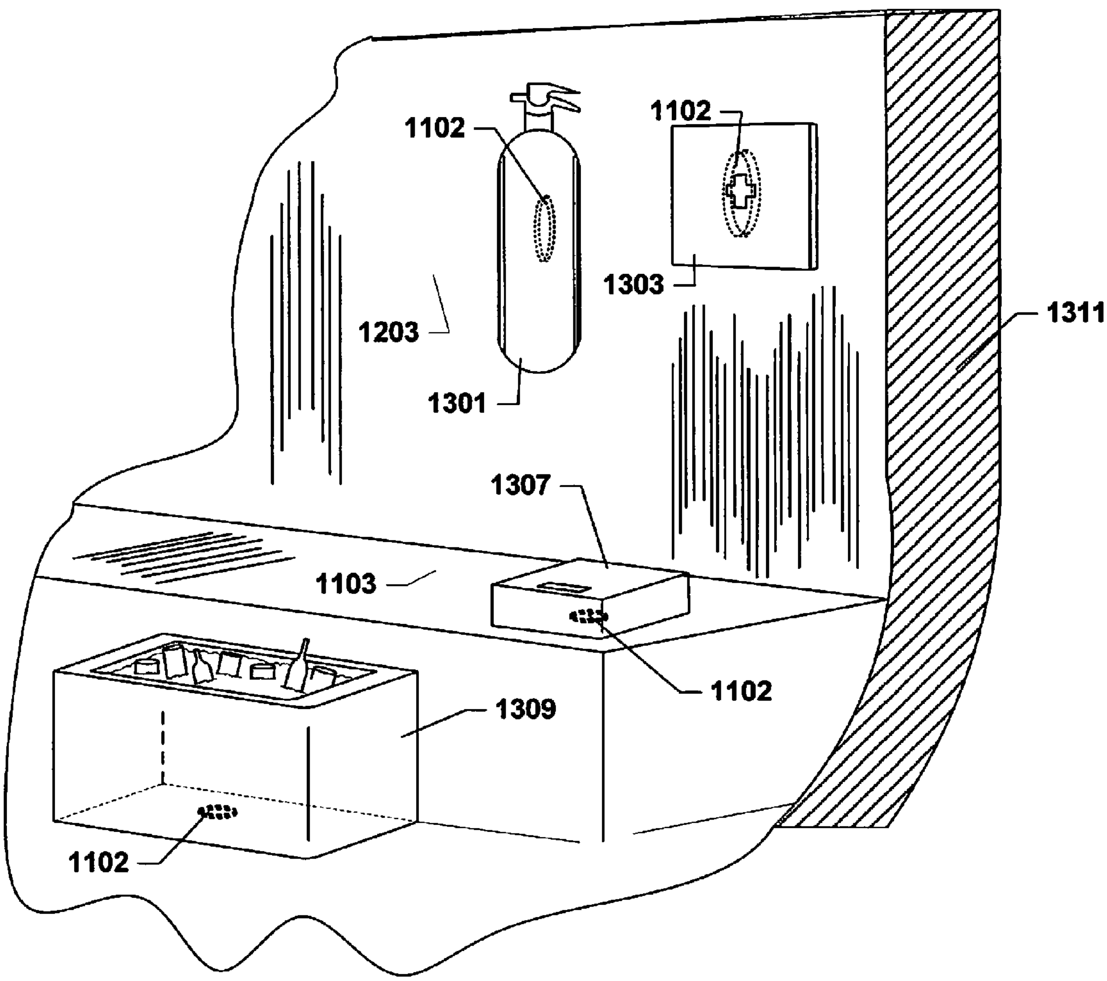
FIG. 13 provides non-limiting examples of objects that may be secured to surfaces in a water craft compartment using magnetic field emission structures.

It will be apparent that the above-described implementations find particular advantageous application for securing objects to surfaces in moving vessels or vehicles where unsecured objects may become a safety hazard. FIG. 13 provides illustration of an exemplary hull 1311 of a water craft within which is a compartment that includes both vertical and horizontal surfaces 1203, 1103 respectively. It is contemplated that object 1101, 1201 may be anything which may is desired to be secured to either a horizontal 1103 or vertical surface 1203. For example, and without limitation, object may be a fire extinguisher 1301; a defibrillator, or medical aid kit 1303, or tool kit 1307, to be secured to the bulkhead in an emergency response vehicle. Further, the object could be a container, such as a drink cooler 1309. The object could be a utensil, a piece of dinnerware, a piece of glassware, a lamp, or a television on a table; a picture frame or decoration on a wall; cookware on a stovetop or storage shelf; a small appliance on a countertop; etc. The object could be an oxygen tank, a munition, a weapon, a satellite, a scuba gear, a sports equipment, a fishing equipment, a crabbing equipment, a furniture, a tool, or a space equipment. The object could be a baby bottle, baby plate, baby toy or other object that can be attached to a baby's chair such as a car seat. The object could even be a cell phone that is attached to a dashboard in a car. The object could be medical equipment in an ambulance, military equipment in a military vehicle, fire equipment on a fire truck, emergency equipment in a cabin, kitchen, or office break room, etc. Generally, the vehicle can be any form of ground vehicle, aircraft, water vessel, or space craft and the object can be anything that needs to be secured within the vehicle.

The first and second magnetic field structures used to practice the present invention can be integrated onto or into a surface and/or an object during manufacturing. Alternatively, the first and second magnetic field structures can be attached to objects and/or surfaces after they have been manufactured. For example, such structures may be provided where they have an attachment mechanism, for example an adhesive, that enables the first magnetic field structure to be attached to the object and the second magnetic field structure to be attached to a surface (or vice versa). Alternatively, an attachment mechanism, for example a screw, might be used to secure such structures to objects and/or surfaces. Generally, all sorts of conventional attachment mechanisms can be used to attach objects and surfaces to such structures where afterwards the structures can be attached or detached as described herein to attach or detach an object to a surface thereby enabling an object in a vehicle to remain secure during movement and enabling the object to be easily detached from the surface.

As described above and shown in the associated drawings, the present invention comprises an apparatus for correlated magnetic assemblies for securing objects in water craft. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

The invention claimed is:

1. A system for securing an object to a surface in a vehicle, comprising:

a first magnetic field emission structure associated with said surface; and a second magnetic field emission structure associated with said object, said first and second magnetic field emission structures being configured with complementary magnetic field sources arranged such that a peak spatial attracting force is generated when said second magnetic field emission structure is brought into substantial complementary alignment with said first magnetic field emission structure thereby securing said object to said surface, where each of said first and second magnetic field emission structures comprise an array of field emission sources each having positions and polarities relating to a spatial force function that corresponds to a relative alignment of the first and second magnetic field emission structures within a field domain, said spatial force function being in accordance with a code, said code corresponding to a code modulo of said first magnetic field emission structure and a complementary code modulo of said second magnetic field emission structure, said code defining a peak spatial force corresponding to substantial alignment of said code modulo of said first magnetic field emission structure with said complementary code modulo of said second magnetic field emission structure, said code also defining a plurality of off peak spatial forces corresponding to a plurality of different misalignments of said code modulo of said first magnetic field emission structure and said complementary code modulo of said second magnetic field emission structure, each of said plurality of off peak spatial forces being less than half of said peak spatial force.

2. The system of claim 1, wherein said spatial attracting force is reduced by rotation of said object with respect to said surface.

3. The system of claim 2, wherein said magnetic field emission structures are affixed to said first and second surfaces.

4. The system of claim 2, wherein said magnetic field emission structures are embedded within said first and second surfaces.

5. The system of claim 1, wherein said first and second arrays are further configured such that a spatial repelling force is generated between said first and second magnetic field emission structures when said structures are brought out of complementary alignment.

6. The system of claim 1, wherein said surface is at least one of a horizontal surface, a vertical surface, an angled surface, or a curved surface.

7. The system of claim 1, wherein said vehicle comprises one of a ground vehicle, an aircraft, a water vessel, or a space craft.

8. The system of claim 1, wherein said object is one of a utensil, a piece of dinnerware, a piece of glassware, a lamp, a television, a picture frame, a decoration, a piece of cookware, an appliance, oxygen tank, a munition, a weapon, a satellite, a scuba gear, a sports equipment, a fishing equipment, a crabbing equipment, a furniture, a tool, a space equipment, a piece of medical equipment, a piece of military equipment, a piece of fire equipment, a piece of emergency equipment, a baby bottle, a baby plate, a baby toy, or a cell phone.

9. A vehicle, comprising:

a surface; and a first magnetic field emission structure associated with said surface, said first magnetic field emission structure configured to enable the generation of a peak spatial attraction force when brought into an angular alignment with a complementarily configured second magnetic field emission structure included with an object to be secured to said surface, where each of said first and second magnetic field emission structures comprise an array of field emission sources each having positions and polarities relating to a spatial force function that corresponds to a relative alignment of the first and second magnetic field emission structures within a field domain, said spatial force function being in accordance with a code, said code corresponding to a code modulo of said first magnetic field emission structure and a complementary code modulo of said second magnetic field emission structure, said code defining a peak spatial force corresponding to substantial alignment of said code modulo of said first magnetic field emission structure with said complementary code modulo of said second magnetic field emission structure, said code also defining a plurality of off peak spatial forces corresponding to a plurality of different misalignments of said code modulo of said first magnetic field emission structure and said complementary code modulo of said second magnetic field emission structure, each of said plurality of off peak spatial forces being less than half of said peak spatial force.

10. The vehicle of claim 9, wherein said spatial attracting force is reduced by rotation of the object with respect to said surface.

11. The vehicle of claim 9, wherein said magnetic field emission structures are affixed to said surface and to said object.

12. The vehicle of claim 9, wherein said magnetic field emission structures are embedded within said surface and said object.

13. The vehicle of claim 9, wherein said first and second magnetic field emission structures are further configured such that a spatial repelling force is generated between said first and second magnetic field emission structures when said structures are brought out of complementary angular alignment.

14. The vehicle of claim 9, wherein said surface comprises a ferromagnetic material, and said first magnetic field emission structure is formed by magnetizing said material.

15. The vehicle of claim 9, wherein said surface is at least one of a horizontal surface, a vertical surface, an angled surface, or a curved surface.

16. The vehicle of claim 9, wherein said vehicle comprises one of a ground vehicle, an aircraft, a water vessel, or a space craft.

17. The vehicle of claim 9, wherein said object is one of a utensil, a piece of dinnerware, a piece of glassware, a lamp, a television, a picture frame, a decoration, a piece of cookware, an appliance, oxygen tank, a munition, a weapon, a satellite, a scuba gear, a sports equipment, a fishing equipment, a crabbing equipment, a furniture, a tool, a space equipment, a piece of medical equipment, a piece of military equipment, a piece of fire equipment, a piece of emergency equipment, a baby bottle, a baby plate, a baby toy, or a cell phone.

18. An assembly, comprising:

an object that incorporates a first field emission structure; and a surface within a vehicle that incorporates a second field emission structure, said object being attached to said surface when the first and second field emission structures are located next to one another and have a complementary alignment with respect to one another, where each of said first and second field emission structures include an array of field emission sources each having positions and polarities relating to a desired spatial force function that corresponds to the complementary alignment of the first and second field emission structures within a field domain, said spatial force function being in accordance with a code, said code corresponding to a code modulo of said first field emission structure and a complementary code modulo of said second field emission structure, said code defining a peak spatial force corresponding to substantial alignment of said code modulo of said first field emission structure with said complementary code modulo of said second field emission structure, said code also defining a plurality of off peak spatial forces corresponding to a plurality of different misalignments of said code modulo of said first field emission structure and said complementary code modulo of said second field emission structure, each of said plurality of off peak spatial forces being less than half of said peak spatial force.

19. The assembly of claim 18, wherein said object is released from the surface when the first and second field emission structures are turned with respect to one another.

20. The assembly of claim 18, wherein said positions and said polarities of each field emission source of each said array of field emission sources are determined in accordance with at least one correlation function.

21. The assembly of claim 20, wherein said at least one correlation function is in accordance with said code.

22. The assembly of claim 21, wherein said code is at least one of a pseudorandom code, a deterministic code, or a designed code.

23. The assembly of claim 21, wherein said code is one of a one dimensional code, a two dimensional code, a three dimensional code, or a four dimensional code.

24. The assembly of claim 18, wherein each field emission source of each said array of field emission sources has a corresponding field emission amplitude and vector direction determined in accordance with the desired spatial force function, wherein a separation distance between the first and second field emission structures and the relative alignment of the first and second field emission structures creates a spatial force in accordance with the desired spatial force function.

25. The assembly of claim 18, wherein said spatial force comprises at least one of an attractive spatial force or a repellant spatial force.

26. The assembly of claim 18, wherein said spatial force corresponds to the peak spatial force of said desired spatial force function when said first and second field emission structures are substantially aligned such that each field emission source of said first field emission structure substantially aligns with a corresponding field emission source of said second field emission structure.

27. The assembly of claim 18, wherein said field domain corresponds to first field emissions from said array of first field emission sources of said first field emission structure interacting with second field emissions from said array of second field emission sources of said second field emission structure.

28. The assembly of claim 18, wherein said polarities of the field emission sources comprise at least one of North-South polarities or positive-negative polarities.

29. The assembly of claim 18, wherein at least one of said field emission sources comprises a magnetic field emission source or an electric field emission source.

30. The assembly of claim 18, wherein at least one of said field emission sources comprises a permanent magnet, an electromagnet, an electret, a magnetized ferromagnetic material, a portion of a magnetized ferromagnetic material, a soft magnetic material.

31. The assembly of claim 18, wherein said surface is at least one of a horizontal surface, a vertical surface, an angled surface, or a curved surface.

32. The assembly of claim 18, wherein said vehicle comprises one of a ground vehicle, an aircraft, a water vessel, or a space craft.

33. The assembly of claim 18, wherein said object is one of a utensil, a piece of dinnerware, a piece of glassware, a lamp, a television, a picture frame, a decoration, a piece of cookware, an appliance, oxygen tank, a munition, a weapon, a satellite, a scuba gear, a sports equipment, a fishing equipment, a crabbing equipment, a furniture, a tool, a space equipment, a piece of medical equipment, a piece of military equipment, a piece of fire equipment, a piece of emergency equipment, a baby bottle, a baby plate, a baby toy, or a cell phone.

* * * * *